United States Patent [19]

Watson

[11] Patent Number: 5,719,896
[45] Date of Patent: Feb. 17, 1998

[54] LOW COST CORONA PRE-IONIZER FOR A LASER

[75] Inventor: Tom A. Watson, Carlsbad, Calif.

[73] Assignee: Cymer Inc., San Diego, Calif.

[21] Appl. No.: 625,500

[22] Filed: Mar. 29, 1996

[51] Int. Cl.$^6$ ............................................. H01S 3/097
[52] U.S. Cl. ................................. 372/86; 372/82; 372/65
[58] Field of Search ............................. 372/86, 55, 82, 372/65

[56] References Cited

U.S. PATENT DOCUMENTS

| 5,247,534 | 9/1993 | mueller-Horsche | 372/86 |
| 5,337,330 | 8/1994 | Larson | 372/86 |
| 5,347,531 | 9/1994 | Nakatani et al. | 372/86 |

*Primary Examiner*—Leon Scott, Jr.
*Attorney, Agent, or Firm*—David J. Power

[57] ABSTRACT

An anode and an a cathode in a gas laser, such as an excimer laser, are spaced in a first direction. A voltage difference between these members produces an electrical discharge which ionizes gasses in the laser to react chemically and produce coherent radiation. First and second tubes made from a dielectric material are designed in contradiction to conventional designs by utilizing a constant, larger tube diameter with thicker tube walls. These first and second tubes extend through the laser in a second direction transverse (preferably perpendicular) to the first direction. The anode, the cathode and the tubes extend through the laser in a direction transverse to the first and second directions. The use of a thicker walled, large tube of constant diameter allows the use of a commercial grade polycrystalline aluminum oxide ceramic, rather than ultra pure ceramics. Bushings having anti-tracking grooves incorporated therein are truly integral with the tube, in that they are directly machined at each end of the tube, making the tubes easier and less costly to manufacture. The tube's larger diameter provides a greater surface area for the generation of photons, thereby creating a greater pre-ionizing effect than conventional designs.

4 Claims, 4 Drawing Sheets

LOW COST CORONA PRE-IONIZER FOR A LASER

FIELD OF THE INVENTION

This invention relates to an apparatus for generating a corona used to ionize a laser gas and, more particularly, to a corona pre-ionizer which is relatively easy and inexpensive to manufacture while providing performance at least equivalent to conventional designs.

BACKGROUND OF THE INVENTION

Today's gas discharge laser systems generally include a sub-system which pre-ionizes the laser gas mixture to facilitate the stability of the chemical reaction of the gases when an electric discharge is produced between an anode and a cathode in the laser. For excimer laser systems, there are two different sub-systems generally utilized: spark and corona.

In the spark pre-ionizer, an array of spark pins, generally comprised of brass, are positioned along the length of the discharge electrodes on either side of the discharge region. When energized, the spark pins generate deep UV photons that ionize the laser gas to create a minimum electron density of about $10^6$ to $10^8$ electrons per $cm^3$ to initiate the ionization phase of the ionization, glow and streamer discharge sequence. The spark pins are usually coupled to the peaking capacitor of the pulse power unit, thereby eliminating the need for additional pre-ionizer circuitry. However, because of the need for a plurality of spark pins, and the finite sparks generated by each pin, it is difficult to achieve a temporally and spatially uniform and homogeneous initial electron density, resulting in some discharge instability. Additionally, the direct coupling of the spark pins to the peaking capacitor causes the high discharge current to pass through the pins, thereby causing excessive erosion of the pins and the promotion of chemical reactions that can rapidly consume the halogen constituents of the laser gas. At high repetition rates, the spark pins may also become the source of localized heating of the laser gas, resulting in index gradients. The direction of the laser beam in such an optically non-uniform medium will change as the index of refraction changes, thereby creating file additional problem of "pointing" instability.

In corona pre-ionizers, two electrodes of opposite polarity are used, having a dielectric positioned in-between. As with the spark pin configuration, the corona pre-ionizer is positioned along the length of the discharge electrodes. When one of the pre-ionizer electrodes is charged with respect to the other electrode, a corona develops on the surface of the dielectric and in the gas near the electrodes. The level of pre-ionization can therefore be controlled by adjusting the dielectric constant and by increasing the rate of rise of the voltage, as evidenced by the well known relationship $$I_{preionization} \alpha \, C \frac{dV}{dt} \tag{1}$$

Although a weaker source of pre-ionization electrons as compared to the spark pre-ionizer, the corona does provide a very uniform initial electron density and is not subject to the erosion and pointing problems associated with spark pre-ionizers. A typical corona pre-ionizer design may include at least one tube having one electrode positioned therein, the other electrode positioned outside the tube, with the dielectric material filling the space between the two electrodes. Bushings are positioned on or near the ends of the tubes to maintain the tubes in an insulated relationship and prevent high voltage tracking along the surface of the tube.

One of the disadvantages of the aforementioned pre-ionizer designs is that the bushings are not truly homogeneous with the tube, thereby requiring the bushings be attached to the tube by an adhesive. The required use of an adhesive severely limits the utility of the pre-ionizer, particularly over extended periods of time, since the adhesive in turn will tend to deteriorate under the effect of the corona discharge and halogen gas environment of an excimer laser discharge chamber. This deterioration of the adhesive contaminates the laser gases, thereby requiring more frequent gas changes. One pre-ionizer design which overcomes these disadvantages is described in U.S. Pat. No. 5,337,330, assigned to the assignee of the present invention and specifically incorporated herein as part of this disclosure. The pre-ionizer taught in the U.S. Pat. No. 5,337,330 patent utilizes first and second tubes manufactured from a dielectric material comprising at least 99.9% pure polycrystalline aluminum oxide ceramic. A side elevation view of a tube described in the U.S. Pat. No. 5,337,330 patent is shown in FIG. 1a. As shown in the figure, hollow tube 5 of a first diameter has bushings 10 of a larger diameter disposed on its opposite ends. The smaller diameter tube has been generally accepted as a design preference in order to minimize the disturbance of the gas flow as it is recirculated through the chamber. Another generally accepted design preference is to minimize the tube wall thickness in order to maximize the tube's capacitance. The use of larger diameter bushings are required to eliminate the electrical surface tracking at the tube's end points where the tube is grounded. Bushings 10, in accordance with the above-referenced design practices, are preferably homogeneous with the ceramic material of tube 5 and are preferably manufactured by machining a single integral piece of material; or alternately formed from multiple parts by a diffusion-bonding process. As more clearly shown in FIG. 1b, a first electrode 15 is coupled to a housing 20 of the laser to form an electric ground. A second electrode 25, acting in a spring-like fashion, is constrained against the surface of tube 5, and extends between bushings 10 on each end of the tube.

One of the problems associated with the design shown in FIG. 1a and 1b is that from a functional standpoint, due to the fact that current flow is proportional to capacitance, it is preferable to have the walls of the tube as thin as possible or practical given manufacturing limitations. One such manufacturing limitation is the inability to form "anti-tracking" grooves at the end of the tube if the tube wall thickness is minimized. These grooves, shown as element 30 in FIG. 1b, function to prevent high voltage arcing from the high voltage cathode to the ground plane located at housing element 20, which was previously described as "high voltage tracking". As a result, bushing elements 10, having a differing diameter to accommodate the anti-tracking grooves, must be incorporated at the ends of the tube. As previously noted, these bushings are preferably homogeneous with the ceramic material of the tube, requiring the machining of a single piece of ceramic, which is extremely cost prohibitive and wasteful. An alternative is to integrate a separate bushing piece as part of the tube through diffusion bonding, which is likewise a difficult process to perform in that each surface must be finely polished and fitted within very close tolerances. This process is very difficult when tube (cylindrical) geometrics are required to be bonded together. Another factor which exacerbates the above-referenced problems associated with the diffusion bonding of two separate components is the need for very high purity materials, as taught in the U.S. Pat. No. 5,337,330 patent. Use of material with a 0.1% less purity can result in component failure. Additionally, the preferred requirement of a minimal tube wall thickness requires an increase in the dielectric strength of the tube material, which also results in the need for very high purity materials. Therefore, what is needed is a corona pre-ionizer which is easily manufacturable, yet provides performance at least comparable to prior art designs.

SUMMARY OF THE INVENTION

It is an object of the present invention to provide a corona pre-ionizer having an improved geometry to allow for greater ease in manufacturing while providing the same or better performance than prior art designs.

It is a feature of the present invention to incorporate anti-tracking features as a truly integral part of the pre-ionizer.

It is another feature of this invention that materials used to construct the pre-ionizer can be of less purity than those materials previously used in prior art designs; providing the advantage that the invention can be easily manufactured.

The object and features of the present invention are realized by ignoring conventional design requirements for a small diameter, thin walled tube; utilizing instead a larger diameter, thicker walled tube having anti-tracking grooves machined directly therein, making the pre-ionizer a single component of constant diameter. Even though tube capacitance is reduced due to the use of thicker walls, as expressed in the following relationship:

$$C = \alpha \frac{\epsilon}{\ln\left(\frac{r_2}{r_1}\right)} \quad (2)$$

when
C=capacitance in farads
e=dielectric constant of material
$r_2$=outer tube radii
$r_1$=inner tube radii
the actual effect on the laser operation, however, is negligible, in that the new design actually improves geometric irradiation of the electrode gap in the gas discharge laser, and the laser output is found to be only weakly dependent upon the pre-ionization density, as expressed by:

$$E_{Laser} \cong \ln(n_{preionization}) \quad (3)$$

where:
E=laser output energy in Joules
n=electron density in discharge region

As a result of the constant diameter, thicker wall design, and the integral machining of anti-tracking grooves, a high-grade, commercially-available dielectric can be used to manufacture the tube, rather than the ultra pure (99.9%) dielectric material necessary in the previous two component designs; and the tube itself can be machined as a single piece to incorporate anti-tracking features, thereby greatly increasing its commercial production capability and reducing manufacturing cost by eliminating the need for an interim and costly diffusion bonding process.

BRIEF DESCRIPTION OF THE DRAWINGS

FIG. 1b is an enlarged fragmentary sectioned view of the pre-ionization tube of FIG. 1a.

DETAILED DESCRIPTION OF THE INVENTION

Figure 1A:
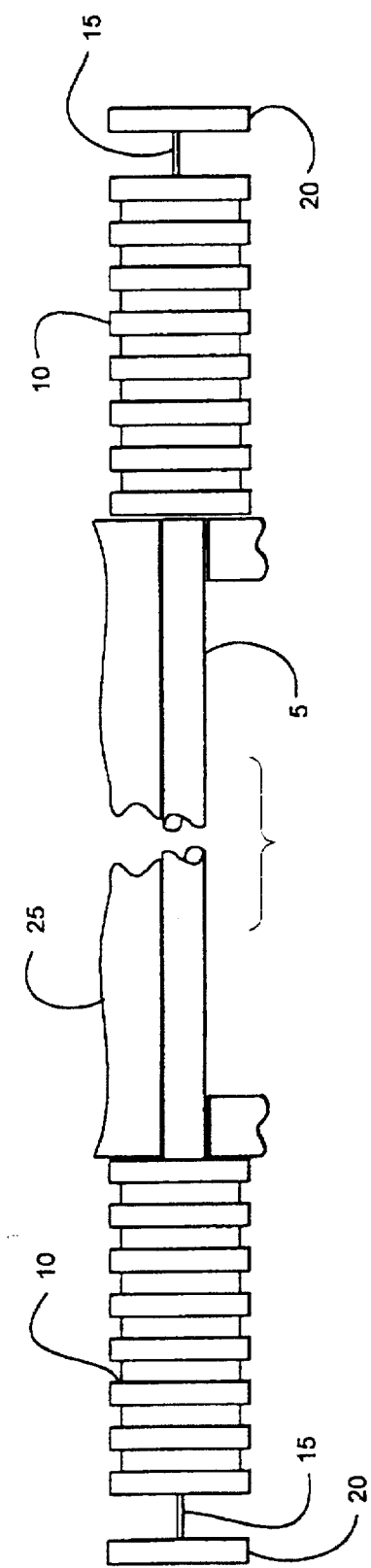
FIG. 1a is a slide elevational view of a prior art pre-ionizer tube design.
Figure 1B:
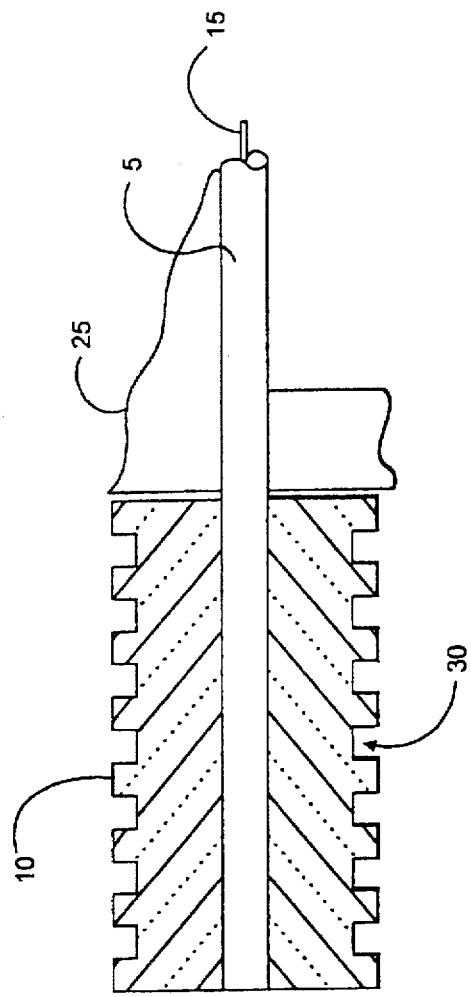

In a first embodiment of the invention, a gas discharge laser such as that described in U.S. Pat. No. 5,337,330, previously incorporated as part of this description, is indicated by 100, and shown disposed within a cavity indicated by broken lines at 105 in FIG. 2. It is to be noted that the present invention may be used in any pulsed gas laser, such as $CO_2$ lasers, CO lasers and excimer lasers. The laser 100 includes an anode 110, which may be electrically grounded, and a cathode 115 which is disposed in cavity 105, and separated from each other in an opposed position. Electrically conductive members 120 provide electrical continuity from cathode 115 to pre-ionizers 125 as described infra. Gases 130 are disposed in cavity 105, and will vary as to type depending on the particular type of gas discharge laser used. For an excimer laser system, these gases are generally a combination of rare gases and halides, such as krypton (Kr) or argon (Ar) and fluorine ($F_2$), with a diluent such as helium (He) or neon (Ne). The gases may be recirculated and purified through laser system sub-components well known in the art.

When a voltage pulse is applied from a source 135 between anode 110 and cathode 115 an electric discharge is produced between the anode and cathode. This electrical discharge ionizes gases 130 in cavity 105, causing a chemical reaction to occur within the gas mixture. For example, a krypton (Kr) and fluorine ($F_2$) gas mixture will react chemically to produce an excited molecule krypton fluoride (KrF). Molecules such as krypton fluoride only exist in an excited state, and decay very rapidly. As the molecule thus formed loses energy, it emits a photon of ultraviolet light, and the molecule dissociates into free atoms which the discharge can excite once again. The free atoms cannot absorb ultraviolet photons, so the photons are reflected from mirrored surfaces (not shown) within the discharge chamber, wherein one of the surfaces is intentionally designed so as to not be a perfect reflector, to allow transmission of some photon energy as a laser pulse.

Depending upon the voltage waveform generated by voltage source 135, the electrical discharge used to form the excited molecule (i.e., KrF) may be divided into three distinct phases: (1) ionization; (2) glow and (3) streamer. The ionization phase, in which the present invention is employed to facilitate, is the generation of high electric fields between anode 110 and cathode 115, which ionizes gas mixture 130. This ionization phase requires a minimum of about $10^6$ to about $10^8$ electrons per $cm^3$ for initiation, which is achieved through the use of pre-ionizer unit 125 by generating deep UV photons 140 which ionize gas mixture 130. Pre-ionizer 125 creates the requisite electron density just prior to the onset of the ionization phase, wherein the electron density reaches about $10^{13}$ electrons per $cm^3$ and gas breakdown occurs. This results in a rapid drop of voltage across the anode and cathode and a simultaneous rapid rise of current passing from cathode 115 to anode 110, triggering the onset of the subsequent glow and streamer phases.

Figure 2:
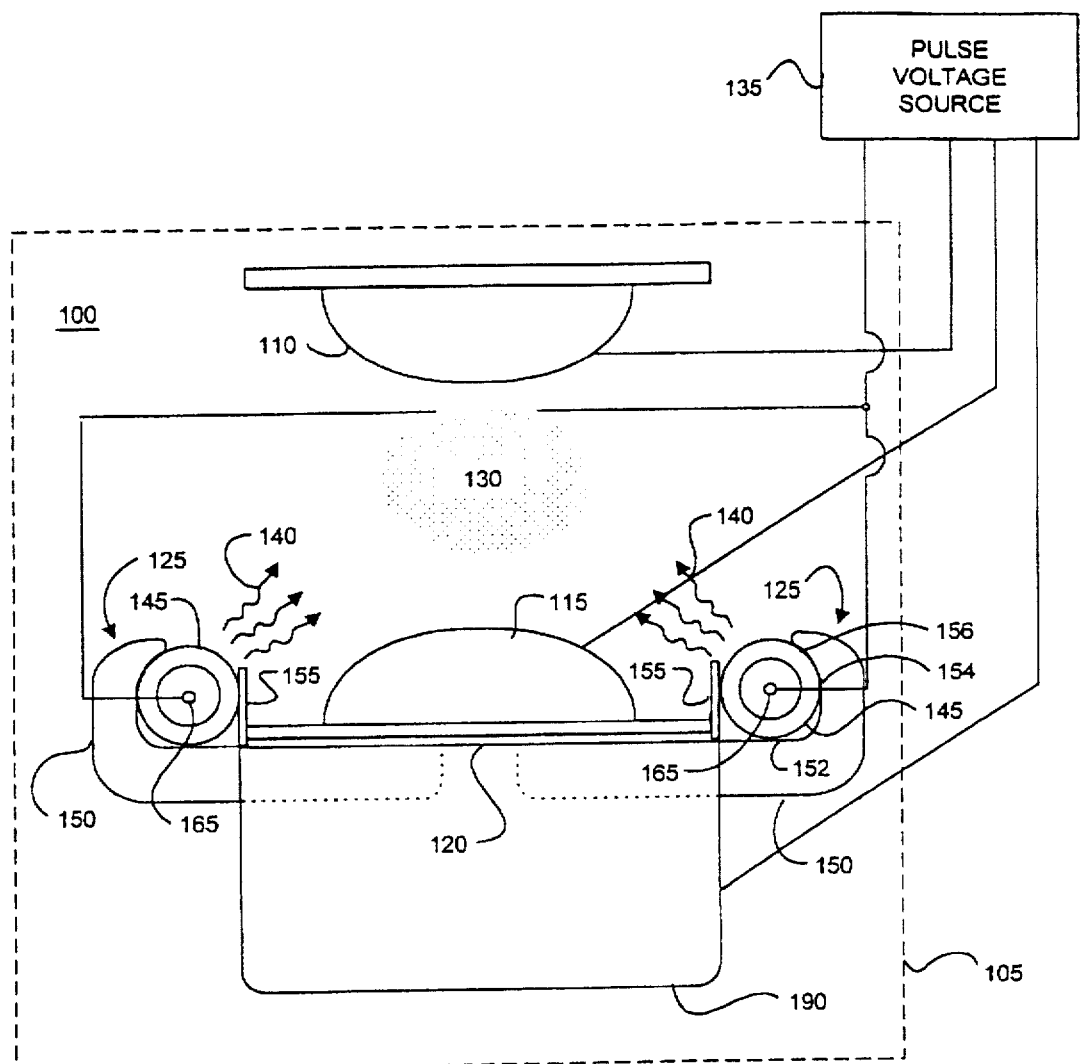
FIG. 2 is a schematic and elevational drawing of laser system subcomponents, including the pre-ionizer of the present invention.

Pre-ionizers 125 may be disposed between electrodes 110 and 115 and may be separated from each other in a position transverse, preferably perpendicular to the opposed orientation of anode 110 and cathode 115, and extend in a direction which transverses cavity 105 in a direction normal to the planar representation of FIG. 2.

Figure 3:
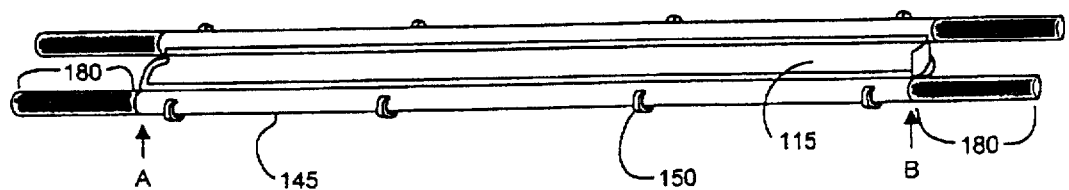
FIG. 3 is an oblique view of the pre-ionizer tubes of the present invention secured in a bracket mount adjacent to the laser cathode.
Figure 5:
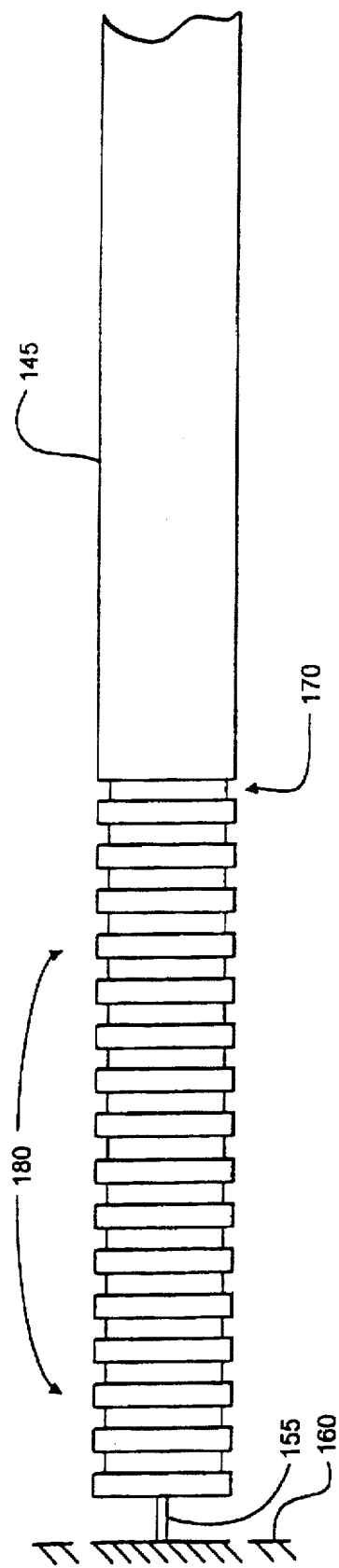
FIG. 5 is an enlarged fragmentary sectional view of the terminus of the pre-ionizer tubes of FIG. 3, depicting the operational grounding of said tubes.

Each pre-ionizer includes a hollow tube 145, which shall be described in detail infra, mounted on a support-positioning bracket 150, as alternatively shown in FIG. 3, wherein the external surface of tube 145 contacts bracket 150 at points 152, 154, and 156 at the ends of tube 145 as shown in FIG. 2. A first electrode 165 is disposed within each of tubes 145, running the length of said tubes. First electrode 165 is coupled to a housing wall 160 of the laser to provide a ground, as shown in FIG. 5.

Referring again to FIG. 2, a second electrode 155, preferably made of a material such as brass, is disposed in line contact along the length of the surface of tubes 145. Refer briefly to FIG. 3. Second electrode 155 is positioned between points a and B adjacent to bushings 180, having anti-tracking grooves 170, therein Second electrode 155 may be of a resilient material to provide a positive resilient force against the tube surface to spring bias said tube into contact with points 152, 154 and 156 of support bracket 150, thereby creating a three (3) line contact with tube 145. Support-positioning bracket 150 is preferably made from an insulator material preferably a 99% pure ceramic material, such as that described infra, to prevent an arcing between tube 145 and adjacent ground structures. This is particularly useful on the downstream side of the discharge where ionized gas being removed from the discharge region between anode 110 and cathode 115 as gas 130 is recirculated. An electrical insulating material for support bracket 150 is also necessary to prevent a shorting between the contact points 152, 154 and 156, which could result in a discontinuity in the emission of photons over the length of tube 145.

Support-positioning brackets 150 are fixedly attached to support block 190 by a series of bolts (not shown), which hold second electrodes 155 in a fixed position and in bias contact with the external surface of tube 145, thereby ensuring that a uniform force is distributed over the length of tube 145 by the 3-line contacts defined by second electrode 155 and support-positioning bracket 150. Support-positioning members 150 are preferably disposed at spaced positions along the length of tube 145 between anti-tracking grooves 170 of bushings 180 as shown in FIG. 3.

First electrode 165 operates to define the first plates of a capacitor, while second electrode 155 operates to define the second opposing plates, with tubes 145 serving as the dielectric material therebetween. Preferably, high voltage is applied to the first electrode 165, with second electrode 155 being grounded. The dielectric material of tube 145 preferably has a high dielectric constant and a high dielectric strength, as will be described infra, sufficient to support a capacitive corona discharge without dielectric breakdown. When a voltage pulse from source 135 is applied between first electrode 165 (as one capacitor plate) and second electrode 155 (as the second capacitor plate), the electrical charges produced cause the generation of deep UV photons 140, as previously described, so that ionization of gases 130 is facilitated when a voltage pulse is produced between anode 110 and cathode 115.

Referring now to FIG. 5, the present invention utilizes an integrated tube design, having bushing element 180 with anti-tracking grooves 170 incorporated therein as a true integral component of the tube. Prior designs, as previously discussed, utilized a two-diameter design, necessitating, for manufacturing purposes, a bonding process to join the bushing component with the tube component. The constant diameter, thicker tube designs is contrary to conventional design rules, as indicated by equation (2) supra, which would predict a reduction in capacitances. Determination of the tube thickness is known to be dependent upon the dielectric strength of the material selected. Those skilled in the art will recognize that optimum performance for a given tube geometry is conventionally determined by selecting a material with the highest dielectric strength and determining a wall thickness to match this capacity. For example, a sapphire material is known to have a dielectric strength ranging from 1200 volts/mil to 1700 volts/mil. Therefore, for a tube 0.035 inches thick, there is a safety factor of 2 if the laser operates at 25 kV. In accordance with the present invention, a material of lessor dielectric strength is utilized in a single piece construction, necessitating a thicker tube wall. As indicated by equation (2) this design would theoretically yield a lower capacitance. The actual effect of this reduced capacitance on laser operation, however, was discovered to be negligible, with a surprising increase in the geometric irradiation of the electrode gap. Because of the constant diameter, thicker tube wall, integral bushing design, a single piece of material can be machined to provide anti-tracking grooves 170. Furthermore, because of the single piece construction, there is no need to use ultra-pure (i.e., 99.9%) polycrystalline translucent aluminum oxide ceramic; and there is no requirement to perform the difficult surface polishing of tube geometries in preparation for diffusion bonding to artificially create the integral relationship between bushing 180 and tube 145. In fact, it has been determined that high purity is not as important a property as porosity of the material. It has been found that the greater the porosity, the more the dielectric strength is reduced. As a result, a commercial grade ceramic, preferably with purity of at least 99.8% and low porosity, such as that manufactured by Coors Ceramics Company under the material No. AD-998E; and having a dielectric strength of 300 volts/mils may be used. Bushings 180, having anti-tracking grooves 170 disposed therein, as previously described, act to prevent high voltage tracking axially along the surface of the tube form the cathode to the ground plane.

TABLE 1

| Parameter | A. Laser Performance | |
|---|---|---|
| | Laser Operation in Prior Art | Laser Operation with New Design |
| Beam Size (H × V), mm $\frac{1}{c^2}$ | (12–13.5) × (23 × 27) | 12.5 × 25.0 |
| Beam Divergence (H × V), m rad | (1–2) × (5–8) | 1.5 × 5.5 |
| Pulse Duration, ns | 35–40 | 37–39 |
| Pulse Energy | | |
| Stability (3σ), % | 2.0–3.0 | 2.7 |
| Efficiency, % | 2.8–3.2 | 3.1 |
| Gas Lifetime, M | 20 | N.M. |

A comparison of laser performance utilizing the diffusion bonded, two component pre-ionizer tube of the prior art and the pre-ionizer of the present invention is shown in Table 1. As shown by the measured values in Table 1, the operation of the laser with the pre-ionizer tubes of the present invention is equivalent to that obtained with the more costly and difficult to manufacture tubes of the prior art. In fact, one of the more critical performance parameters, pulse energy stability, which is dependent upon both an unperturbated gas flow and uniform pre-ionization within the chamber, is shown to remain stable, and strong evidence that the present design functions at least as well as the prior art designs, even utilizing a larger diameter, thicker walled tube of the present invention. In fact, it has been determined that the use of the larger diameter tube of the present invention actually provides a greater illumination; and, therefore, pre-ionization, than measured with tubes of the prior art.

Figure 4A:
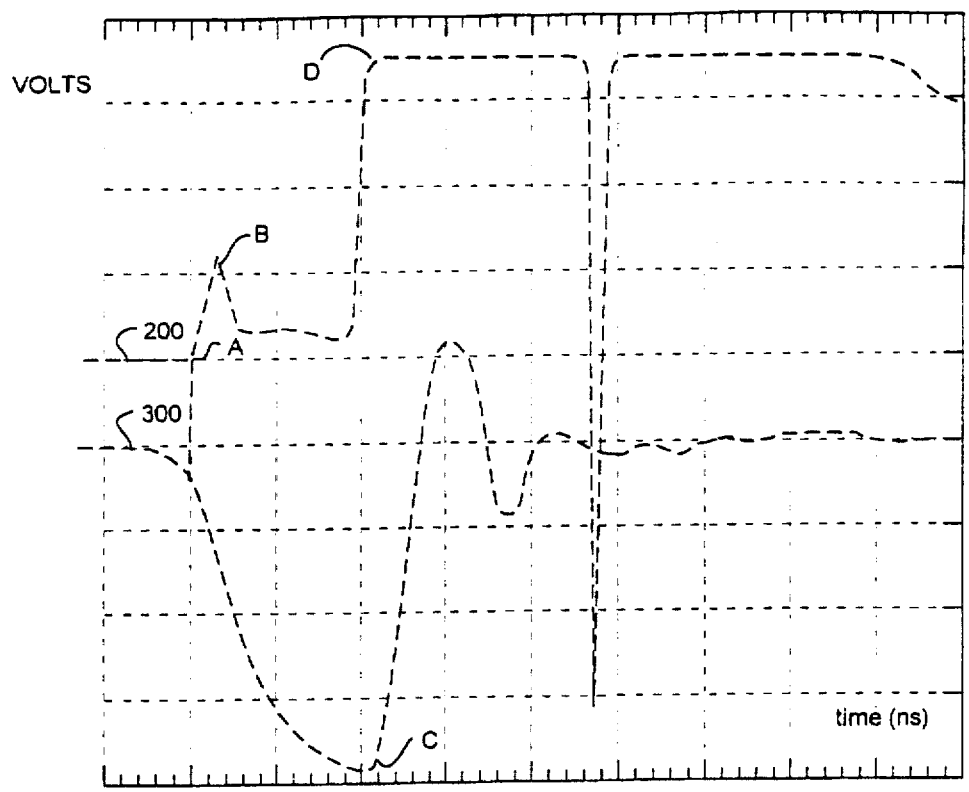
FIG. 4a is a two channel waveform of a laser utilizing pre-ionizer tubes of the prior art design.

Referring now to FIG. 4a, a two channel waveform of a laser having pre-ionizer tubes of the prior art is shown. In the figure, the abscissa is time with each block representing 100 ns, and the ordinate is in volts, with each block representing 100 mV for Channel 1 and 5.0 v for Channel 2. Channel 1, shown by 200, represents the illumination as measured by a photo diode positioned at the laser output Channel 2, shown by 300, represents the voltage on the laser's electrodes. At point A of Channel 1, pre-ionization occurs, creating an illumination having a maximum measured value of 125 mV, as the voltage on the electrodes, shown by 300, continues to rise during the ionization phase. Breakdown voltage occurs at point C of 300, resulting in the onset of the glow phase, evident by the measured illumination at point D of 200.

Figure 4B:
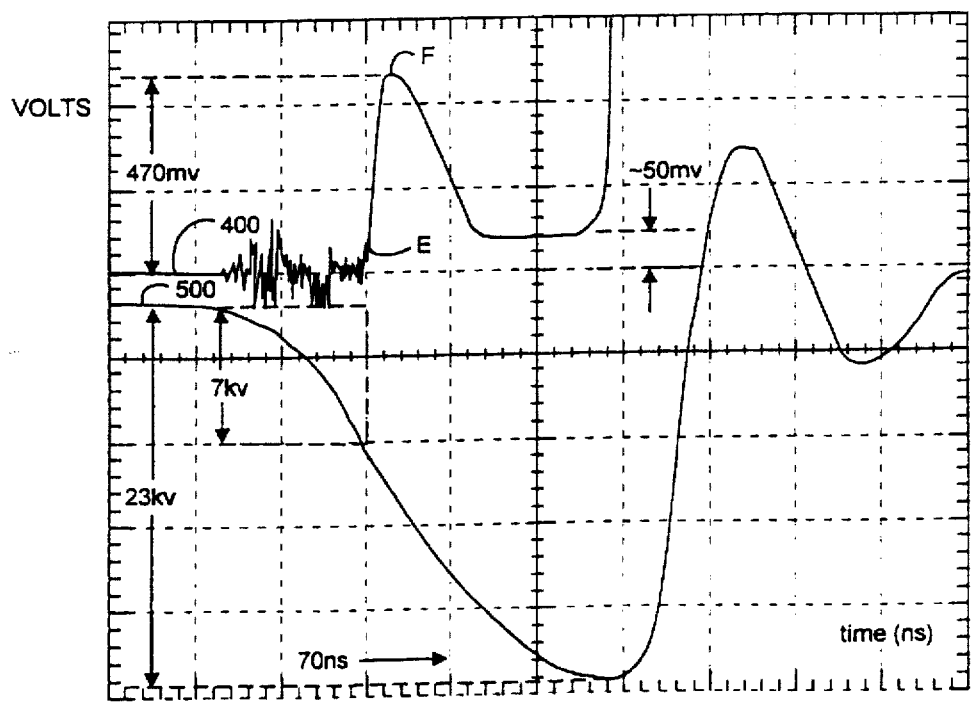
FIG. 4b is a two channel waveform of a laser utilizing pre-ionizer tubes of the present invention.

Referring now to FIG. 4b, a similar two channel wave form is shown by a laser having pre-ionizer tubes in accordance with the present invention. In the figure the abscissa is time, with each block representing 50 ns, and the ordinant is in volts, with each block representing 200 mV for Channel 1 and 5.0 V for Channel 2. Channel 1, shown by 400, is a measure of illumination just as in the previous figure. Channel 2, shown by 500, similarly represents voltage on the laser's electrodes. Just as in the previous example, point E depicts the onset of pre-ionization. However, as shown by the wave form, a maximum illumination of 470 mW is measured at point F; approximately a four fold increase in illumination, resulting in enhanced ionization as compared to the prior art pre-ionizer. The basis for this surprising enhancement is speculated as being due to the increased surface area resulting from the use of a larger diameter tube.

While the invention has been described in connection with what is presently considered to be the preferred embodiments, it is to be understood that the invention is not limited to the disclosed embodiments, but on the contrary, covers various modifications and equivalents included within the spirit and scope of the following claims. Therefore, persons of ordinary skill in this field are to understand that all such equivalents are included within the scope of the claims.

What is claimed is:

1. A low cost laser pre-ionizer for a laser comprising:

A) a hollow cylindrical ceramic tube
       1) comprised entirely of a single dielectric material;
       2) defining a tube section, a tube diameter, a tube length and two tube ends;
       3) defining two generally cylindrical bushing sections located at each of said two tube ends, both of said bushing sections having circumferential anti-tracking grooves defining a maximum diameter and a minimum diameter, said maximum diameter being equal to, or substantially equal to, said tube diameter;

B) a first electrode disposed inside said hollow cylindrical ceramic tube and connected to ground;

C) a second electrode held in compressive contact with said tube section along the entire length, or substantially the entire length, of said tube section, said second electrode being connected to a source of high voltage.

2. A low cost pre-ionizer as in claim 1 wherein said dielectric material is polycrystalline aluminum oxide ceramic.

3. A low cost pre-ionizer as in claim 1 wherein said polycrystalline aluminum oxide is commercial grade aluminum oxide.

4. A low cost pre-ionizer as in claim 2 wherein said polycrystalline aluminum oxide is less than 99.9% pure aluminum oxide.

* * * * *

UNITED STATES PATENT AND TRADEMARK OFFICE
CERTIFICATE OF CORRECTION

PATENT NO. : 5,719,896
DATED : February 17, 1998
INVENTOR(S) : Watson

It is certified that error appears in the above-identified patent and that said Letters Patent is hereby corrected as shown below:

Column 8,
Line 34, after "claim" change "1" to -- 2 --.

Signed and Sealed this

Third Day of May, 2005

JON W. DUDAS
*Director of the United States Patent and Trademark Office*